US012771523B2

(12) United States Patent
Abotabl et al.

(10) Patent No.: US 12,771,523 B2
(45) Date of Patent: Oct. 20, 2026

(54) POWER HEADROOM REPORTING FOR DUPLEX COMMUNICATIONS

(71) Applicant: Qualcomm Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/596,147

(22) Filed: Mar. 5, 2024

(65) Prior Publication Data

US 2025/0286695 A1 Sep. 11, 2025

(51) Int. Cl.
*H04L 5/16* (2006.01)
*H04L 5/00* (2006.01)
*H04W 52/36* (2009.01)

(52) U.S. Cl.
CPC .............. *H04L 5/16* (2013.01); *H04L 5/0053* (2013.01); *H04W 52/365* (2013.01)

(58) Field of Classification Search
CPC . H04L 5/16; H04L 5/0053; H04L 5/14; H04L 5/1423; H04W 52/365; H04W 52/146
See application file for complete search history.

(56) References Cited

U.S. PATENT DOCUMENTS

2022/0110072 A1* 4/2022 Zhang .................... H04L 5/1423
2022/0159580 A1* 5/2022 Su ........................ H04W 52/146

OTHER PUBLICATIONS

3GPP: "3rd Generation Partnership Project, Technical Specification Group Radio Access Network, 5G, NR, Medium Access Control (MAC) protocol specification (3GPP TS 38.321 version 17.7.0 Release 17)", ETSI TS 138 321 V17.7.0, Feb. 2024, 257 Pages.
3GPP: 3rd Generation Partnership Project, Technical Specification Group Radio Access Network, 5G, NR, Radio Resource Control (RRC), Protocol specification (3GPP TS 38.331 version 17.7.0 Release 17), ETSI TS 138 331 V17.7.0, Feb. 2024, 1314 Pages.

* cited by examiner

*Primary Examiner* — Khoa Huynh
(74) *Attorney, Agent, or Firm* — Dinsmore & Shohl LLP

(57) ABSTRACT

Certain aspects of the present disclosure provide techniques for power headroom reporting for duplex communications. A method for wireless communications by an apparatus includes obtaining a configuration that indicates one or more parameters for power headroom reporting, wherein the one or more parameters include an indication to enable reporting of at least first information associated with full-duplex communications; and sending a first power headroom report that comprises the first information associated with full-duplex communications.

16 Claims, 10 Drawing Sheets

POWER HEADROOM REPORTING FOR DUPLEX COMMUNICATIONS

INTRODUCTION

Field of the Disclosure

Aspects of the present disclosure relate to wireless communications, and more particularly, to techniques for power headroom reporting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes obtaining a configuration that indicates one or more parameters for power headroom reporting, wherein the one or more parameters include an indication to enable reporting of at least first information associated with full-duplex communications; and sending a first power headroom report that comprises the first information associated with full-duplex communications.

Another aspect provides a method for wireless communications by an apparatus. The method includes sending a configuration that indicates one or more parameters for power headroom reporting, wherein the one or more parameters include an indication that enables reporting of at least first information associated with full-duplex communications; and obtaining a first power headroom report that comprises the first information associated with full-duplex communications.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
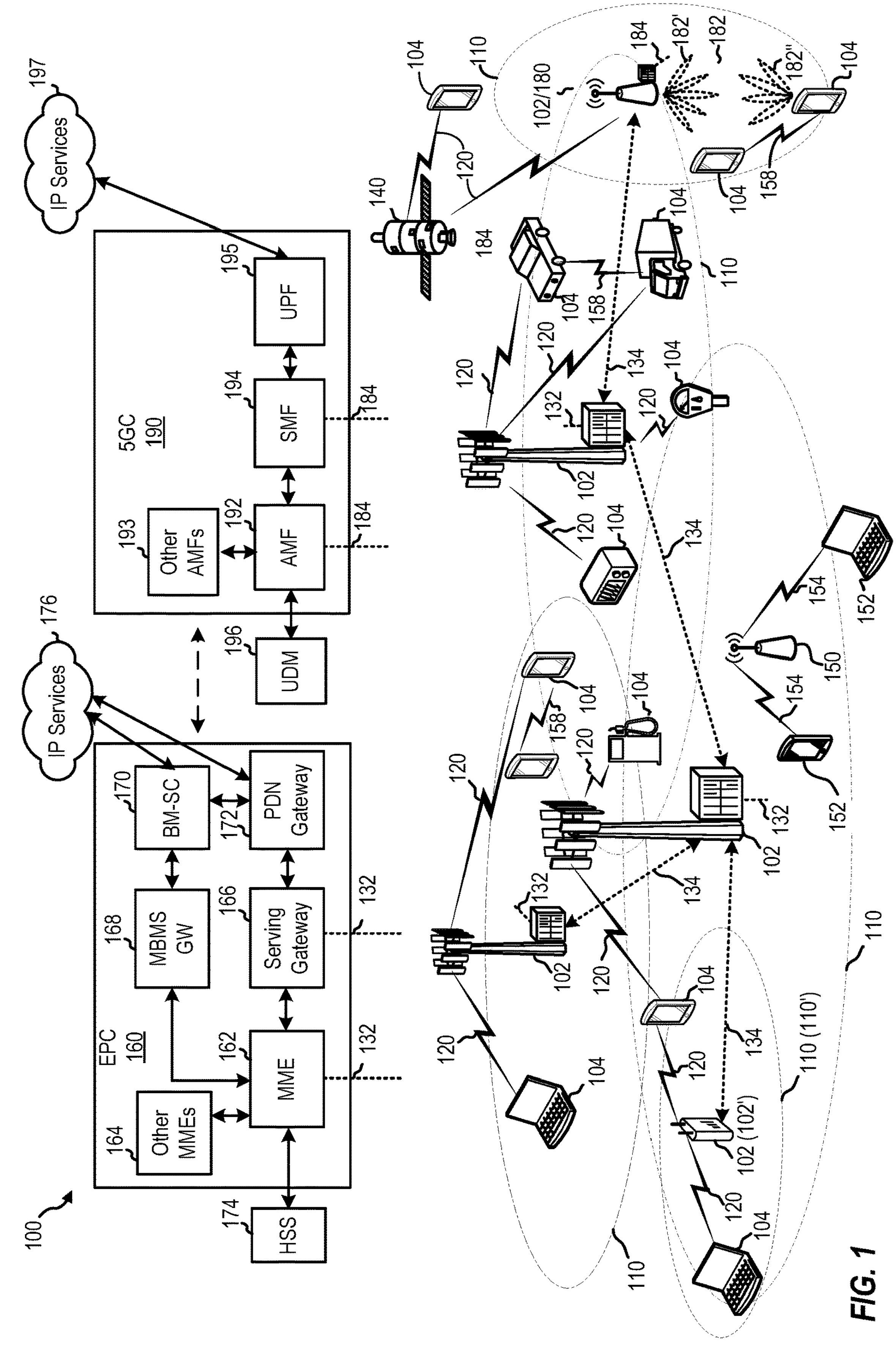
FIG. 1 depicts an example wireless communications network.

Aspects of the present disclosure provide apparatuses, methods, processing systems, and computer-readable mediums for power headroom reporting for duplex communications.

In certain wireless communications systems (e.g., a 5G New Radio (NR) system and/or any future wireless communications system), a user equipment (UE) may inform a network entity (e.g., a base station or any disaggregated entity thereof) about the UE's transmit power via a power headroom report (PHR). The PHR may indicate an estimation of transmit power for an uplink transmission by a UE. The PHR may include, for example, a power headroom value and a maximum allowed transmit power (e.g., $P_{CMAX}$). The power headroom value may be the difference between the maximum allowed transmit power and the estimated transmit power for an uplink transmission. A negative power headroom value may indicate that the transmit power estimated for a transmission exceeds the transmit power available (e.g., the maximum allowed transmit power) for the transmission. Moreover, the power headroom value may depend on certain transmit power control parameters (such as a path loss associated with a communication channel, a target value for a received signal power at the network entity, a frequency bandwidth of a transmission occasion, etc.).

In certain wireless communication systems (e.g., a 5G NR system and/or any future wireless communications system), there are RF emission specifications for the output power of wireless communications devices (e.g., a UE), for example, to mitigate inter-device interference. As an example, for a 5G NR system, a UE may be configured (e.g., via a pre-configuration or signaling) with a maximum allowed transmit power $P_{CMAX,f,c}$ for carrier f of serving cell c in each slot for certain communications (e.g., PUCCH, PUSCH, RACH, and/or SRS transmissions). The maximum allowed transmit power may define an upper bound for the power of an RF signal output by a UE.

The network entity may adjust certain communication parameter(s) (e.g., the number of frequency resources allocated for a transmission and/or the modulation and coding scheme (MCS)) based on the PHR. As an example, the network entity may reduce the number frequency resources and/or the MCS when the power headroom value is low. In some cases, the PHR may allow the network entity to estimate the path loss between the UE and the network entity. The network entity may determine to enable or disable certain communication features (e.g., carrier aggregation) based on the path loss. For example, when the path loss is low, the network entity may enable uplink carrier aggregation, and when the path loss becomes high, the network entity may disable uplink carrier aggregation to allow the UE to focus the uplink transmit power on a single carrier frequency.

In certain cases, a UE may be allocated communication resources for half-duplex (HD) communications and full-duplex (FD) communications. During FD communications, a UE may obtain signals and send signals simultaneously (e.g., in the same transmission occasion). During HD communications, a UE may send signals and obtain signals, but at different times (e.g., non-overlapping transmission occasions). In some cases, a UE may be allocated a first transmission occasion (e.g., a slot) for HD communications and a second transmission occasion for subband full-duplex (SBFD) communications within the same carrier frequency of a serving cell. For SBFD communication, a UE may be allocated a first subband for downlink communications and a second subband for uplink communications in the same transmission occasion (e.g., one or more symbols and/or slots). In certain cases, the UE may be allocated resources for FD communications via carrier aggregation (e.g., multiple carriers in the same cell group) and/or multi-connectivity (e.g., multiple carriers in multiple cell groups). FD communications may include carrier aggregation, multi-connectivity, and/or SBFD communications.

Technical problems for power headroom reporting include, for example, providing effective power headroom information that takes into account differing transmit power controls used for different types of duplex communications (such as HD, FD, and/or SBFD). A UE may be configured with a first set of transmit power control parameters for HD communications and a second set of transmit power control parameters for FD communications. A set of transmit power control parameters may include, for example, a path loss for the communication channel between the UE and a network entity, a target value for the received power at the network entity, the frequency bandwidth of a transmission occasion, etc. The first set of transmit power control parameters for HD communications may be different from the second set of transmit power control parameters for FD communications, for example, due to differing channel characteristics and/or interference controls (e.g., related to reducing or mitigating cross-link interference (CLI) and/or self-interference (SI)). Accordingly, the power headroom values could also differ between FD and HD communications.

Certain wireless communications (e.g., 5G NR) may specify that a power headroom value is determined based on a transmission communicated in a specific carrier of a serving cell. In some cases, a UE may be triggered to report power headroom information for FD communications in a specific carrier when the UE is allocated uplink resources for HD communications in the same carrier, or vice versa. However, certain wireless communication systems (e.g., 5G NR) have not established how to communicate power headroom information for FD communications, especially when transmit power controls may differ depending on the type of duplex communications. For example, a UE may be triggered to report power headroom information for a transmission on a carrier with different transmit power control parameters for HD communications and FD communications, and the UE may default to reporting power headroom information for HD communications without reporting power headroom information for FD communications, which can affect the performance of wireless communications.

Aspects described herein overcome the aforementioned technical problem(s) by providing various schemes for reporting power headroom information associated with FD communications and HD communications. The schemes may define when a UE is expected or allowed to report power headroom information associated with FD communications and/or HD communications. Accordingly, the schemes ensure the network entity is aware of what type of power headroom information with respect to duplex communications is reported by a UE. In certain aspects, a UE may be configured (via a pre-configuration and/or signaling) to report power headroom information associated with a specific type of duplex communications based on the type of duplex communications used for communicating the PHR. In certain aspects, a UE may be configured to report power headroom information associated with specific type of duplex communications when the uplink resources are allocated for the same type of duplex communications. In certain aspects, a UE may be configured (via a pre-configuration and/or signaling) to report power headroom information associated with a specific type of duplex communications regardless of the uplink resources that can accommodate the PHR being allocated for a different type of duplex communications when the power headroom information corresponds to a reference transmission (e.g., a virtual transmission). In certain aspects, a UE may be configured to report power headroom information associated with a specific type of duplex communications regardless of the uplink resources that can accommodate the PHR being allocated for a different type of duplex communications. In certain aspects, a UE may notify a network entity that the UE is capable of power headroom information associated with a specific type of duplex communications. In certain aspects, a UE may obtain an indication to enable power headroom reporting for specific type(s) of duplex communication.

The techniques for power headroom reporting for duplex communications described herein provide various beneficial technical effects and/or advantages. The techniques for power headroom reporting for duplex communications ensure that a network entity is aware of the type of duplex communications associated with power headroom information in a PHR. The power headroom reporting for duplex communications described herein ensure that accurate and/or reliable power headroom information for various types of duplex communications is obtained at the network entity. The power headroom reporting for duplex communications described herein allows a network entity to adjust certain communication parameter(s) based on a PHR as discussed above, especially for FD communications, which can increase throughput, reduce latencies, and/or improve channel usage efficiencies.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
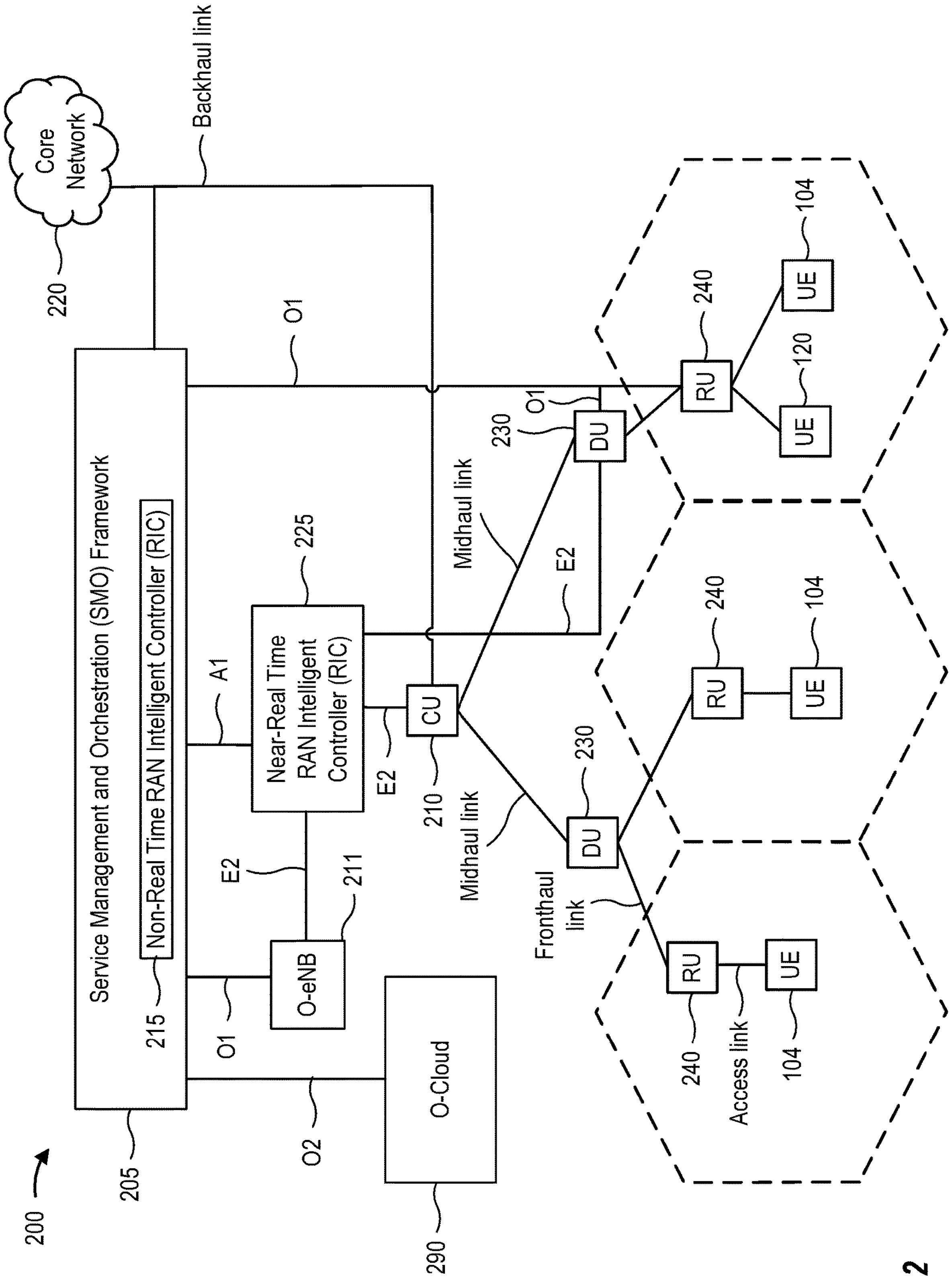
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
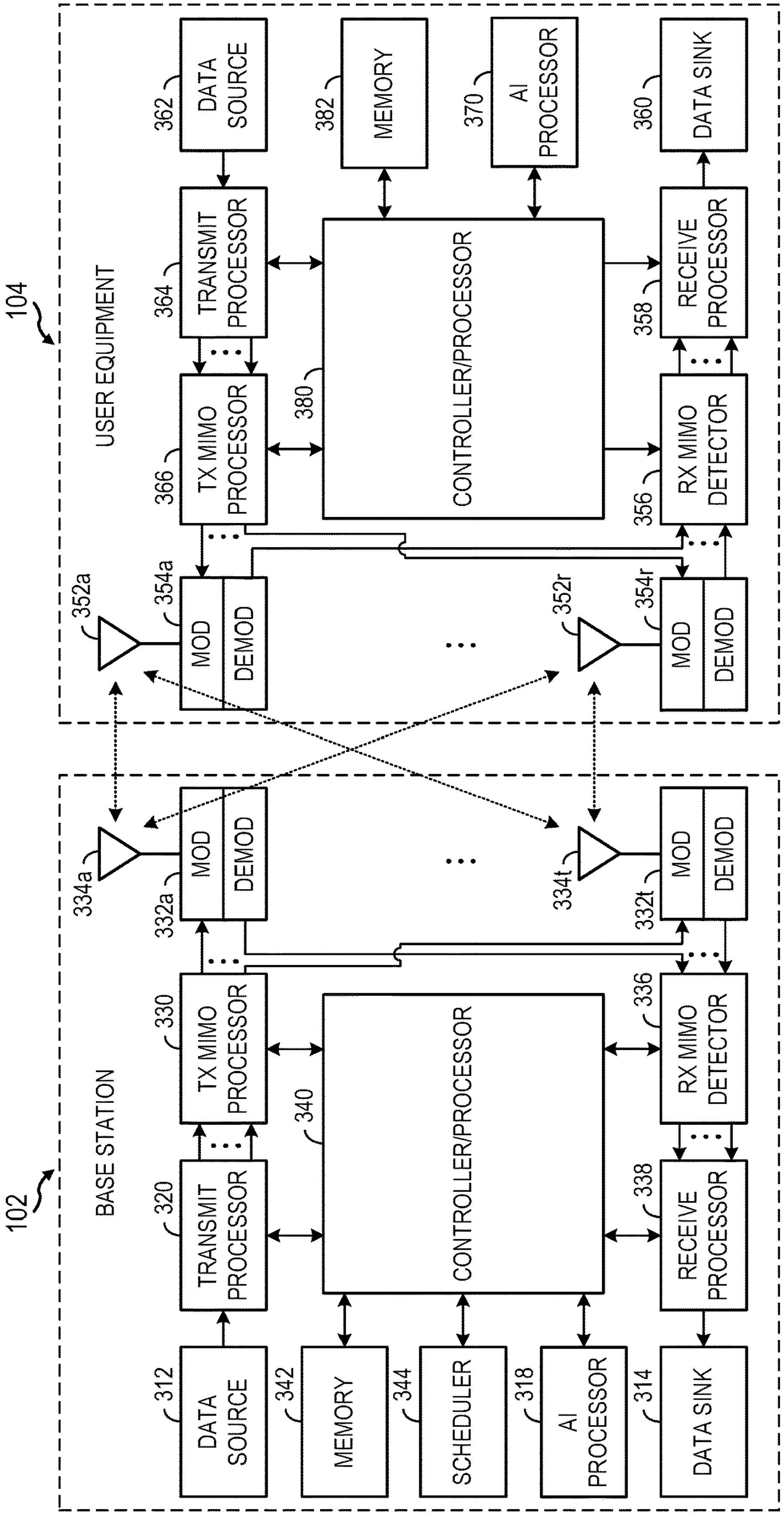
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figure 4B:
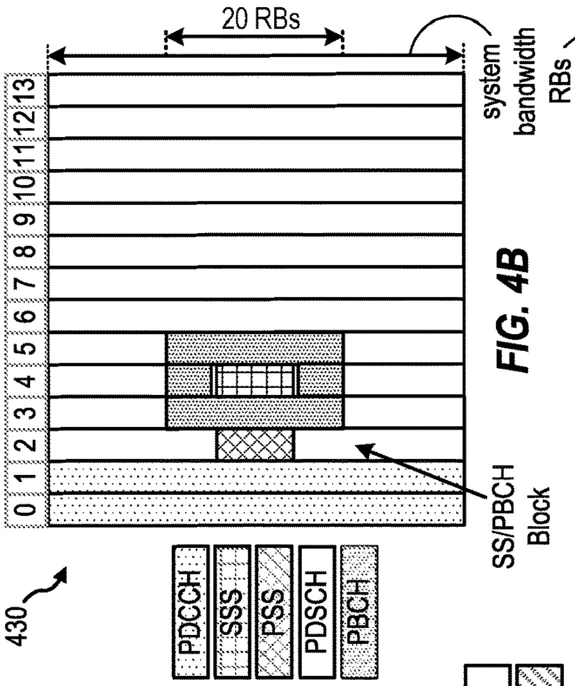
FIGS. 4A, 4B, 4C, and 4D depict various example aspects of data structures for a wireless communications network.
Figure 4A:
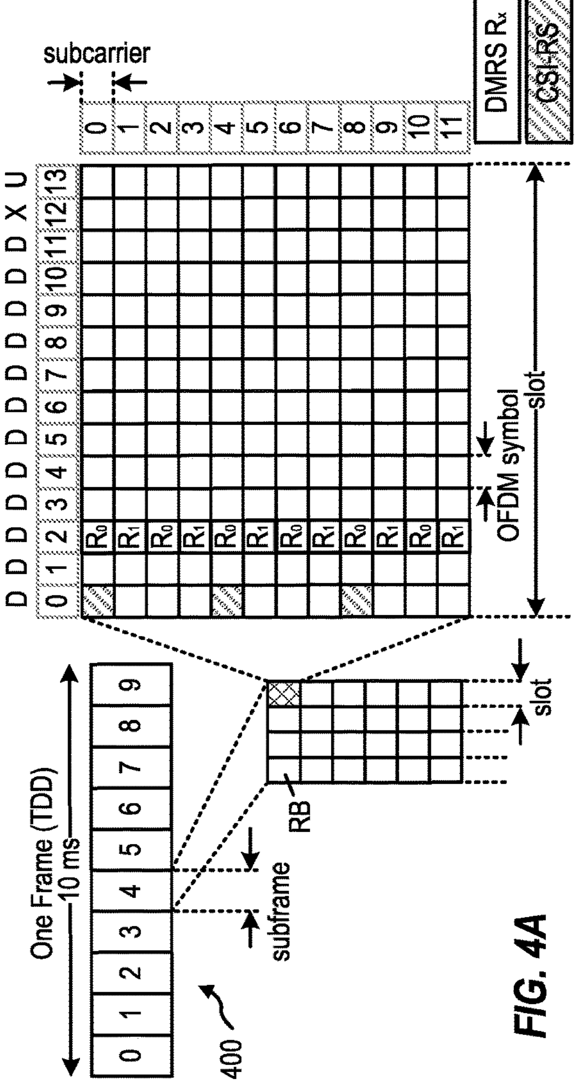
Figure 4D:
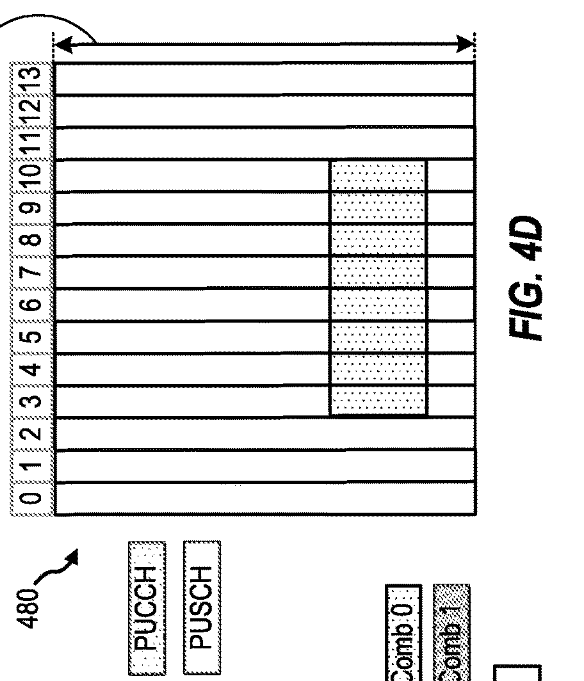
Figure 4C:
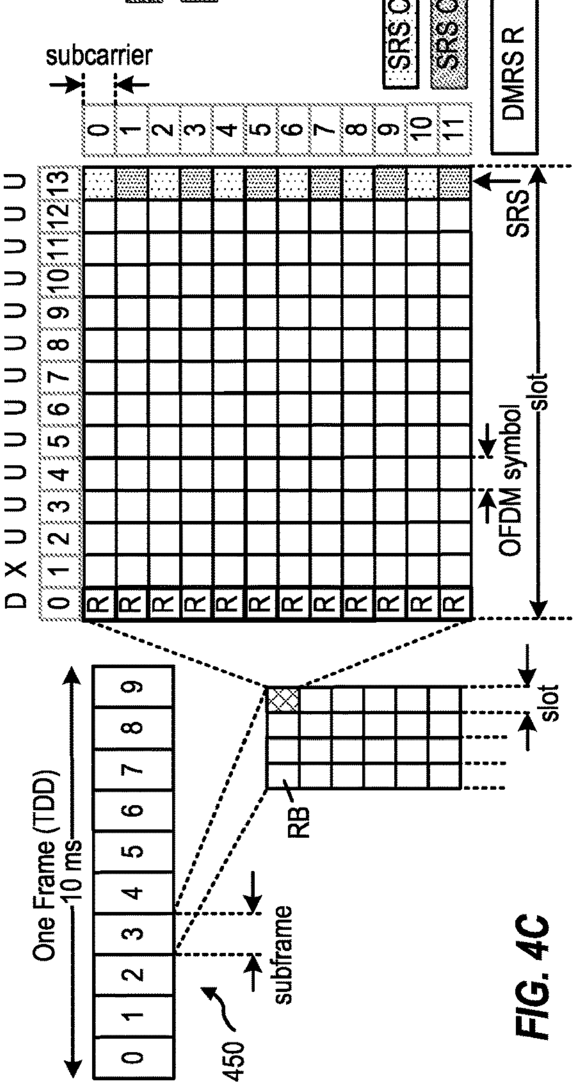

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology $\mu$, there are $2^{\mu}$ slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times 15$ kHz, where u is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Power Headroom Reporting for Duplex Communications

Aspects of the present disclosure provide various schemes for reporting power headroom information associated with specific duplex communications. The various schemes for reporting power headroom information associated with FD communications and/or HD communications discussed below enable a network entity to be aware of the specific type of duplex communications associated with the power headroom information, especially, when different transmit power controls are used for different types of duplex communications.

Figure 5:
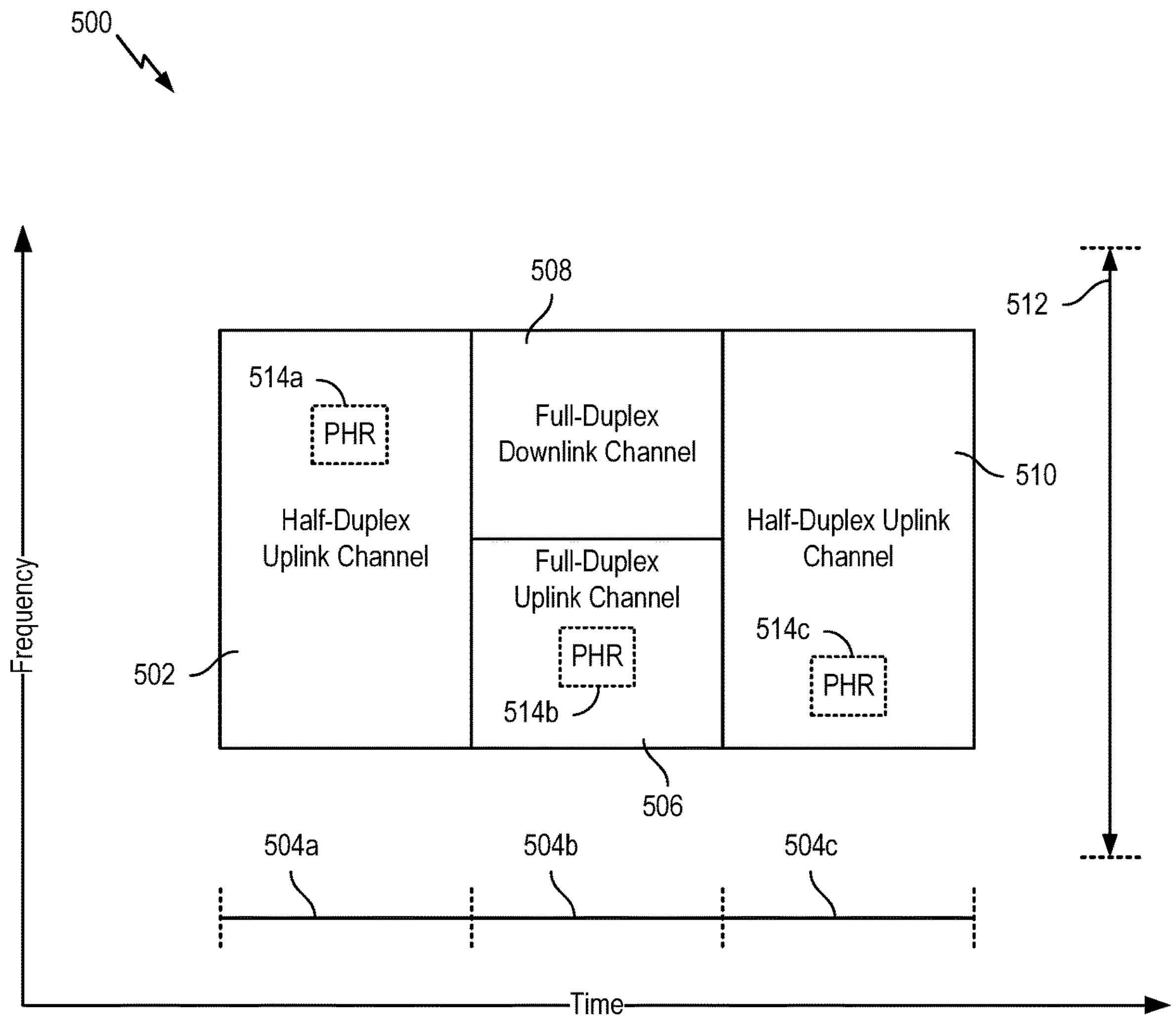
FIG. 5 depicts an example scheme for communicating power headroom information associated with certain duplex communications.

FIG. 5 depicts an example scheme 500 for communicating power headroom information associated with FD communications and/or HD communications. In this example, a UE may be allocated a first set of uplink resources (hereinafter "the first HD uplink channel 502" which may include one or more time-frequency resources) for HD communications in a first transmission occasion 504*a* (e.g., a slot). In a second transmission occasion 504*b* (e.g., a slot), the UE may be allocated a second set of uplink resources (hereinafter "the FD uplink channel 506") and a set of downlink resources (hereinafter "the FD downlink channel 508") for FD communications. In certain aspects, each of the FD uplink channel 506 and FD downlink channel 508 may be subbands (e.g., bandwidth parts (BWPs)) of a carrier 512 defined by a frequency bandwidth. The FD uplink channel 506 and FD downlink channel 508 may form subbands for subband FD (SBFD) communications. In a third transmission occasion 504*c* (e.g., a slot), the UE may be allocated a third set of uplink resources (hereinafter "the second HD uplink channel 510") for HD communications. The first HD uplink channel 502, the FD uplink channel 506, and the second HD uplink channel 510 may be arranged in the same carrier 512. Any of the first HD uplink channel 502, the FD uplink channel 506, and the second HD uplink channel 510 may be or include a BWP (or a sub-carrier or subband) of the carrier 512.

In certain cases, the UE may be triggered (e.g., periodically or in response to certain event(s)) to report power headroom information for FD communications and/or HD communications, for example, in a first PHR 514*a*, a second PHR 514*b*, and/or a third PHR 514*c*. Note that the dashed lines for the PHRs 514*a-c* indicate that that any of the PHRs 514*a-c* may be an optional or alternative example as further described herein. The power headroom information may be, indicate, or include a power headroom value for a specific transmission and a maximum allowed transmit power (e.g., $P_{CMAX}$) associated with a specific carrier in which the transmission is communicated. The power headroom value may be or include a difference between the maximum transmit power and the estimated power for a transmission (e.g., an SRS transmission and/or uplink channel transmission). In some cases, the power headroom value may be for an actual transmission or a reference transmission (e.g., a virtual transmission which is not communicated). In some cases, the power headroom value may be less than zero (e.g., a negative value), which may indicate that the estimated transmit power for a transimssion exceeds the maximum allowed transmit power.

In certain aspects, the maximum allowed transmit power may be common to FD communications and HD communications in a carrier (e.g., the carrier 512). The same value for the maximum allowed transmit power may be used for FD communications and HD communications in the carrier. In certain aspects, different or separate values for the maximum allowed transmit power may be assigned to FD communications and HD communications in the carrier. For example, a first value for the maximum allowed transmit power may be set for FD communications in a carrier, and a second value for the maximum allowed transmit power may be set for HD communications in the carrier. The first value may be the same or different from the second value.

In certain aspects, a PHR (e.g., any of the PHRs 514*a-c*) may be multiplexed in a communication channel (e.g., PUSCH) with a payload (e.g., data). The PHR may be communicated via medium access control (MAC) signaling, such as a MAC control element (MAC-CE). The PHR may include one or more entries of power headroom information for one or more serving cells. In certain aspects, the PHR may include first power headroom information for a FD transmission and/or second power headroom information for a HD transmission.

In certain aspects, a UE may be configured (via a preconfiguration and/or signaling) to report power headroom information associated with a specific type of duplex communication when the uplink resources that can accommodate a power headroom report are allocated for the same type of duplex communications of the power headroom information. For example, when the UE is triggered to report power headroom information for FD communications, the UE may report such power headroom information in a PHR (e.g., the second PHR 514*b*) via resource(s) allocated for FD communications (e.g., the FD uplink channel 506). Likewise, when the UE is triggered to report power headroom information for HD communications, the UE may report such power headroom information in a PHR (e.g., the first PHR 514*a* and/or the third PHR 514*c*) via resource(s) allocated for HD communications (e.g., the first HD uplink channel 502 and/or the second HD uplink channel 510).

In certain aspects, when the UE is triggered to report power headroom information for a specific type of duplex communications, the UE may wait to send the power headroom information in a PHR via resource(s) that match the type of duplex communications of the power headroom information. For example, suppose the UE is triggered, before the first transmission occasion 504*a*, to report power headroom information for FD communications, the UE may refrain from sending the power headroom information in a payload communicated via the first HD uplink channel 502 in the first transmission occasion 504*a* and send the power headroom information in the second PHR 514*b* via resource (s) allocated for FD communications (e.g., the FD uplink channel 506). The power headroom information may be based on a FD communication via a set of resources allocated for FD communications (e.g., a FD transmission via the FD uplink channel 506). That is, the power headroom information may indicate or include a power headroom value determined for a FD transmission.

As another example, suppose the UE is triggered, during the first transmission occasion 504*a*, to report power headroom information for HD communications, the UE may refrain from sending the power headroom information in a payload communicated via the FD uplink channel 506 in the second transmission occasion 504*b* and send the power headroom information in the third PHR 514*c* via resource(s) allocated for HD communications (e.g., the second HD uplink channel 510). The power headroom information may be based on a HD communication via a set of resources allocated for HD communications (e.g., the HD transmission in the second HD uplink channel 510). That is, the power headroom information may include a power headroom value determined for a HD transmission.

In certain aspects, the UE may be configured (via a pre-configuration and/or signaling) to report power headroom information associated with a specific type of duplex communications regardless of the type of duplex communications associated with the uplink resources used to communicate a PHR. As an example, when the UE is triggered to report power headroom information for FD communications, the UE may report such power headroom information in a PHR (e.g., any of the PHRs 514*a-c*) via resource(s) allocated for HD communications and/or FD communications (e.g., the first HD uplink channel 502, the FD uplink channel 506, and the second HD uplink channel 510).

In certain aspects, the UE may be configured (via a pre-configuration and/or signaling) to report power headroom information associated with a specific type of duplex communications regardless of the type of duplex communications associated with the uplink resources used to communicate a PHR when the power headroom information corresponds to (or is based on) a reference transmission (e.g., a virtual transmission). As an example, when the UE is triggered to report power headroom information for a FD reference transmission or a HD reference transmission, the UE may report such power headroom information in a PHR (e.g., any of the PHRs 514*a-c*) via resource(s) allocated for HD communications and/or FD communications (e.g., the first HD uplink channel 502, the FD uplink channel 506, and the second HD uplink channel 510).

In some cases, a UE may notify a network entity that the UE is capable of performing a particular power headroom reporting scheme discussed above. Such a notification may be implicit and/or explicit. For example, the UE may notify a network entity that the UE supports uplink power controls for FD communications, and such a notification may also indicate that the UE expects to use certain power headroom reporting scheme(s) for duplex communications. In certain aspects, it may be assumed that the UE performs power headroom reporting for duplex communication according to any of the schemes discussed herein with or without the UE notifying the network entity of such capability.

In certain aspects, the UE and the network entity may be pre-configured to use certain power headroom reporting schemes for duplex communications. For example, the UE may be configured to report power headroom information associated with a specific type of duplex communication when the uplink resources that can accommodate a power headroom report are allocated for the same type of duplex communications of the power headroom information, and the network entity may expect the power headroom report to follow such a reporting scheme for power headroom information associated with duplex communications. The particular configuration used at a UE for power headroom reporting may allow a network entity to know the type of duplex communications associated with the reported power headroom information. Depending on the reporting scheme, the network entity may be aware that the power headroom information is for a HD communication or a FD communication. Accordingly, the reporting schemes for duplex communications enable the network entity to obtain reliable and accurate power headroom information to adapt communications to the estimated transmit power provided by a UE, especially, when different transmit power controls are used for different types of duplex communications.

Note that the arrangement (e.g., bandwidth, duration, frequency position, time position, etc.) of the first HD uplink channel 502, the FD uplink channel 506, and/or the second HD uplink channel 510 in the time domain and/or the frequency domain is merely an example of HD and FD channels being arranged in a carrier (e.g., the carrier 512) over time. Aspects of the present disclosure may be applied to any other suitable arrangement of HD and FD channels in a carrier over time.

Example Signaling for Power Headroom Reporting of Duplex Communications

Figure 6:
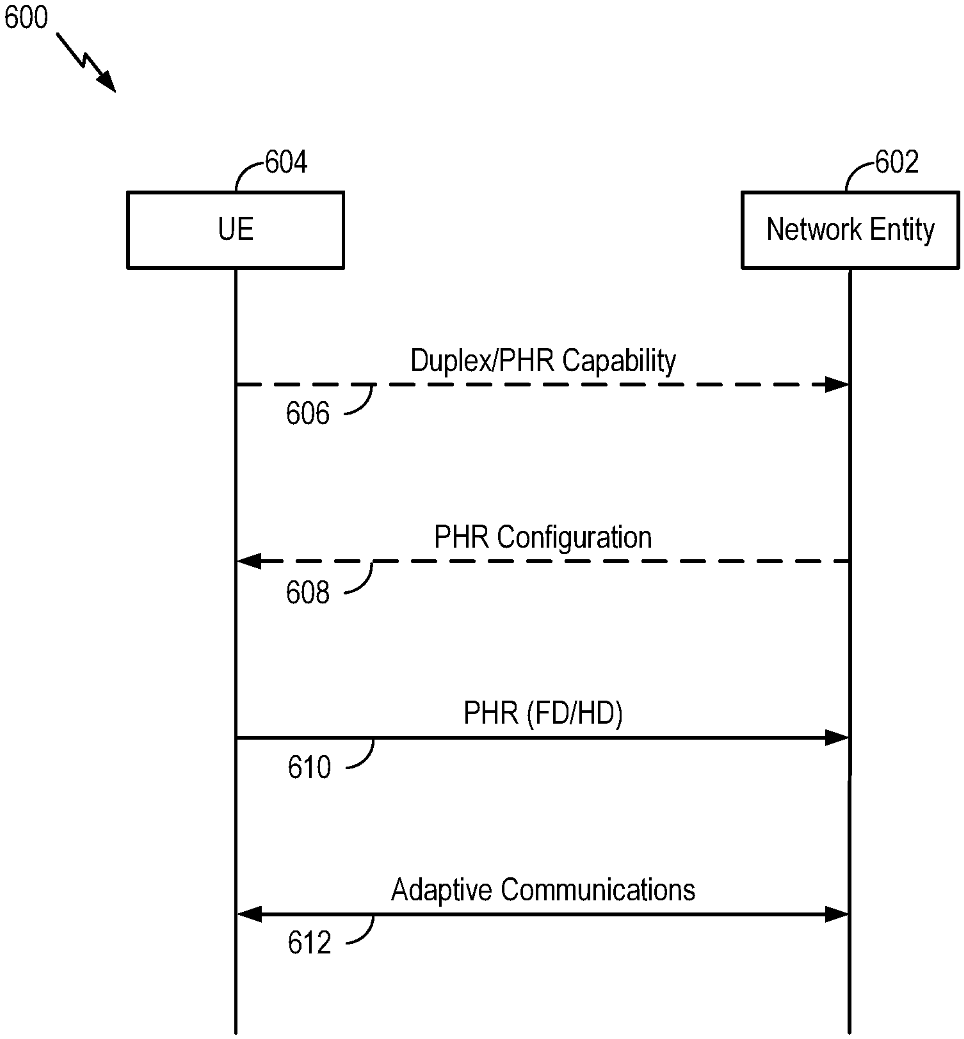
FIG. 6 depicts a process flow for power headroom reporting for certain duplex communications.

FIG. 6 depicts a process flow 600 for power headroom reporting for duplex communications in a system between a network entity 602 and a user equipment (UE) 604. In some aspects, the network entity 602 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 604 may be another type of wireless communications device and network entity 602 may be another type of network entity or network node, such as those described herein. Note that any operations or signaling illustrated with dashed lines may indicate that that operation or signaling is an optional or alternative example.

At 606, the UE 604 sends, to the network entity 602, capability information that indicates the UE 604 supports reporting power headroom information associated with FD communications. The capability information may indicate that the UE 604 is capable of reporting power headroom information associated with FD communications according to any of the reporting schemes described herein with respect to FIG. 5. In some cases, the capability information may indicate that the UE 604 supports application of uplink power control(s) for FD communications, and such an indication may imply that the UE 604 also supports reporting power headroom information associated with FD communications. The uplink power controls for FD communications may be, for example, PUCCH, PUSCH, PRACH, and/or SRS transmission(s). The capability information may indicate that the UE 604 is capable of applying uplink power control(s) for FD communications.

At 608, the UE 604 obtains, from the network entity 602, a power headroom reporting configuration. The configuration may indicate one or more parameters for power headroom reporting. In certain aspects, the one or more parameters may include a field (hereinafter "the duplex PHR field") that indicates to enable reporting of power headroom information associated with FD communications and/or HD communications. The duplex PHR field may be or include a Boolean flag that indicates whether reporting of power headroom information associated with FD communications and/or HD communications is enabled or disabled. A value of true for the duplex PHR field may indicate that the reporting of power headroom information associated with FD communications and/or HD communications is enabled. As an example, when the duplex PHR field is set to true, and when the UE 604 is triggered to report a PHR (e.g., according to a periodicity and/or certain event(s)), the UE 604 may report the power headroom information associated with a specific type of duplex communications according to any of the reporting schemes described herein with respect to FIG. 5. The configuration may be communicated via radio resource control (RRC) signaling, MAC signaling, DCI, and/or system information. In certain aspects, the UE 604 may be preconfigured to report power headroom information associated with a specific type of duplex communications with or without the indication to enable such reporting in the configuration as discussed above.

In certain aspects, the duplex PHR field may depend on the one or more parameters also indicating that multi-entry power headroom reporting is enabled (e.g., when a field multiplePHR is set to true). As an example, when the duplex PHR field is set to true (and the field multiplePHR is set to true), and when the UE 604 is triggered to report a PHR, the UE 604 may report power headroom information for FD communications and HD communications associated with a specific carrier via a multi-entry PHR MAC-CE.

At 610, the UE 604 sends, to the network entity 602, a PHR including power headroom information associated with FD communications and/or HD communications, for example, as described herein with respect to FIG. 5. Suppose, for example, the UE 604 is configured (via a preconfiguration and/or signaling, such as the configuration at 608) to report power headroom information associated with a specific type of duplex communication when the uplink resources that can carry a power headroom report are allocated for the same type of duplex communications as the type associated with the power headroom information. Thus, when the UE 604 is triggered to report a PHR associated with FD communications, the UE 604 sends the PHR via resource(s) allocated for FD communications at 610.

At 612, the UE 604 communicates with the network entity 602, based at least in part on the power headroom report. For example, when the power headroom report indicates a high value for the power headroom associated with FD communications, the network entity 602 may increase the frequency resource allocation (e.g., via carrier aggregation and/or increasing a bandwidth for an uplink subband for SBFD) for communications between the UE 604 and the network entity 602. When the power headroom report indicates a low value for the power headroom associated with FD communications, the network entity 602 may reduce the frequency resource allocation (e.g., by releasing a carrier or decreasing a bandwidth for the uplink subband for SBFD) for communications between the UE 604 and the network entity 602. In certain cases, the network entity 602 may adjust transmit power controls based on the power headroom report. For example, when the power headroom report indicates an increased value (e.g., corresponding to a decrease in the path loss) for the power headroom associated with FD communications, the network entity 602 may reduce the transmit power allocated for transmissions from the UE 604 to the network entity 602 for FD communications. When the power headroom report indicates a decreased value for the power headroom (e.g., corresponding to an increase in the path loss) for FD communications, the network entity 602 may increase the transmit power allocated for transmissions from the UE 604 to the network entity 602 for FD communications. Accordingly, the network entity 602 may adjust certain communication parameter(s) based on the PHR, especially for FD communications, which can increase throughput, reduce latencies, and/or improve channel usage efficiencies.

Example Operations for Power Headroom Reporting

Figure 7:
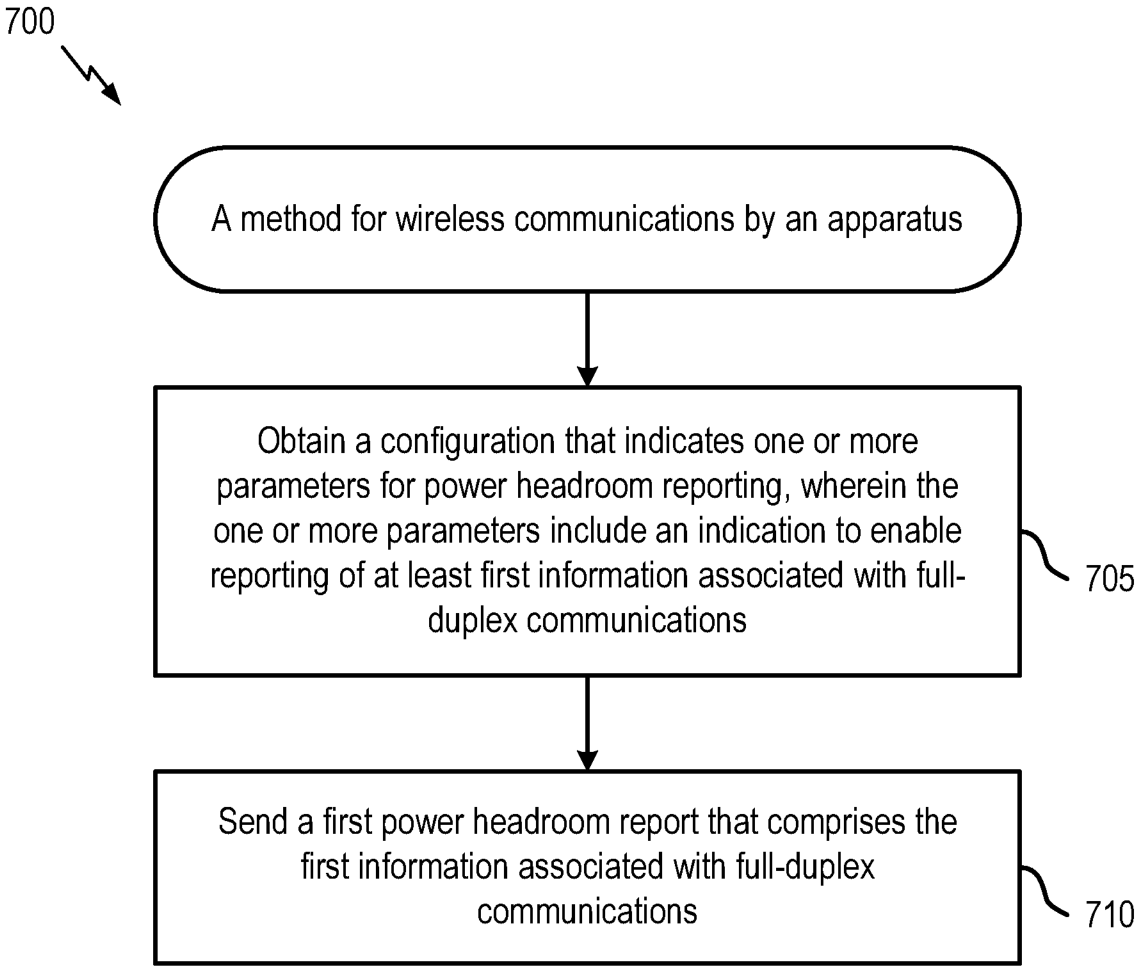
FIG. 7 depicts a method for wireless communications.

FIG. 7 shows a method 700 for wireless communications by an apparatus, such as UE 104 of FIGS. 1 and 3.

Method 700 begins at block 705 with obtaining a configuration that indicates one or more parameters for power headroom reporting, wherein the one or more parameters include an indication to enable reporting of at least first information associated with full-duplex communications. In certain aspects, the indication includes a field that indicates to enable reporting of the first information associated with full-duplex communications and second information associated with half-duplex communications.

Method 700 then proceeds to block 710 with sending a first power headroom report that comprises the first information associated with full-duplex communications, for example, as described herein with respect to FIG. 5. In certain aspects, the first information comprises: a power headroom value for full-duplex communications; and a maximum allowed transmit power. The first information being associated with full-duplex communications may refer to the first information comprising a power headroom value determined for a full-duplex transmission. The power headroom report may allow a network entity to adjust certain communication parameter(s) based on the power headroom report, especially for FD communications, which can increase throughput, reduce latencies, and/or improve channel usage efficiencies.

In certain aspects, block 710 includes sending the first power headroom report via one or more first resources allocated for full-duplex communications, wherein the first information is based on a full-duplex communication via the one or more first resources. The first information being based on a full-duplex communication via the one or more first resources may refer to the first information indicating a power headroom value determined (or estimated) for the full-duplex communication via the one or more first resources. In certain aspects, method 700 further includes refraining from sending the first power headroom report in a payload communicated via one or more second resources allocated for half-duplex communications, wherein the one or more second resources occur in time before the one or more first resources.

In certain aspects, method 700 further includes sending, via one or more first resources allocated for half-duplex communications, a second power headroom report that includes second information associated with half-duplex communications, wherein the second information is based on a half-duplex communication via the one or more first resources. The second information being associated with half-duplex communications may refer to the second information comprising a power headroom value determined for a half-duplex transmission. In certain aspects, the second information comprises: a power headroom value for half-duplex communications; and a maximum allowed transmit power. In certain aspects, method 700 further includes refraining from sending the second power headroom report in a payload communicated via one or more second resources allocated for full-duplex communications, wherein the one or more second resources occur in time before the one or more first resources.

In certain aspects, block 710 includes sending the first power headroom report via one or more first resources allocated for half-duplex communications, wherein the first information is based on a communication via one or more second resources allocated for full-duplex communications. In certain aspects, the communication includes a reference transmission.

In certain aspects, method 700 further includes sending, via one or more first resources allocated for full-duplex communications, a second power headroom report that includes second information, wherein the second information is based on a communication via one or more second resources allocated for half-duplex communications. In certain aspects, the communication includes a reference transmission.

In certain aspects, method 700 further includes sending capability information that indicates the apparatus supports application of uplink power control for full-duplex communications. In certain aspects, such an indication may indicate that apparatus supports (is capable of or has a capability for) reporting power headroom information associated with full-duplex communications.

In certain aspects, method 700 further includes sending capability information that indicates the apparatus supports reporting power headroom information associated with full-duplex communications.

Figure 9:
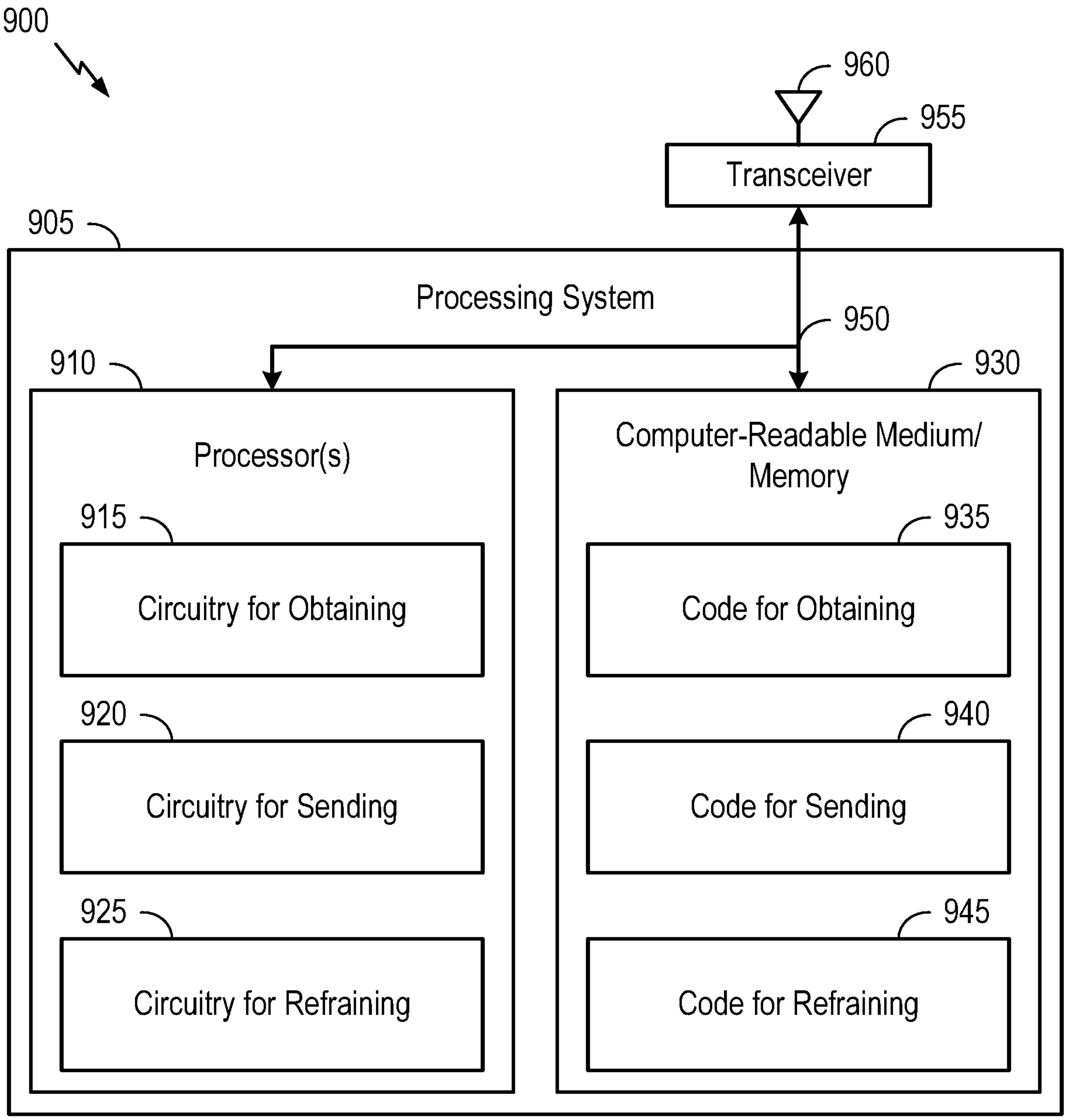
FIG. 9 depicts aspects of an example communications device.

In certain aspects, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative operations are possible consistent with this disclosure.

Figure 8:
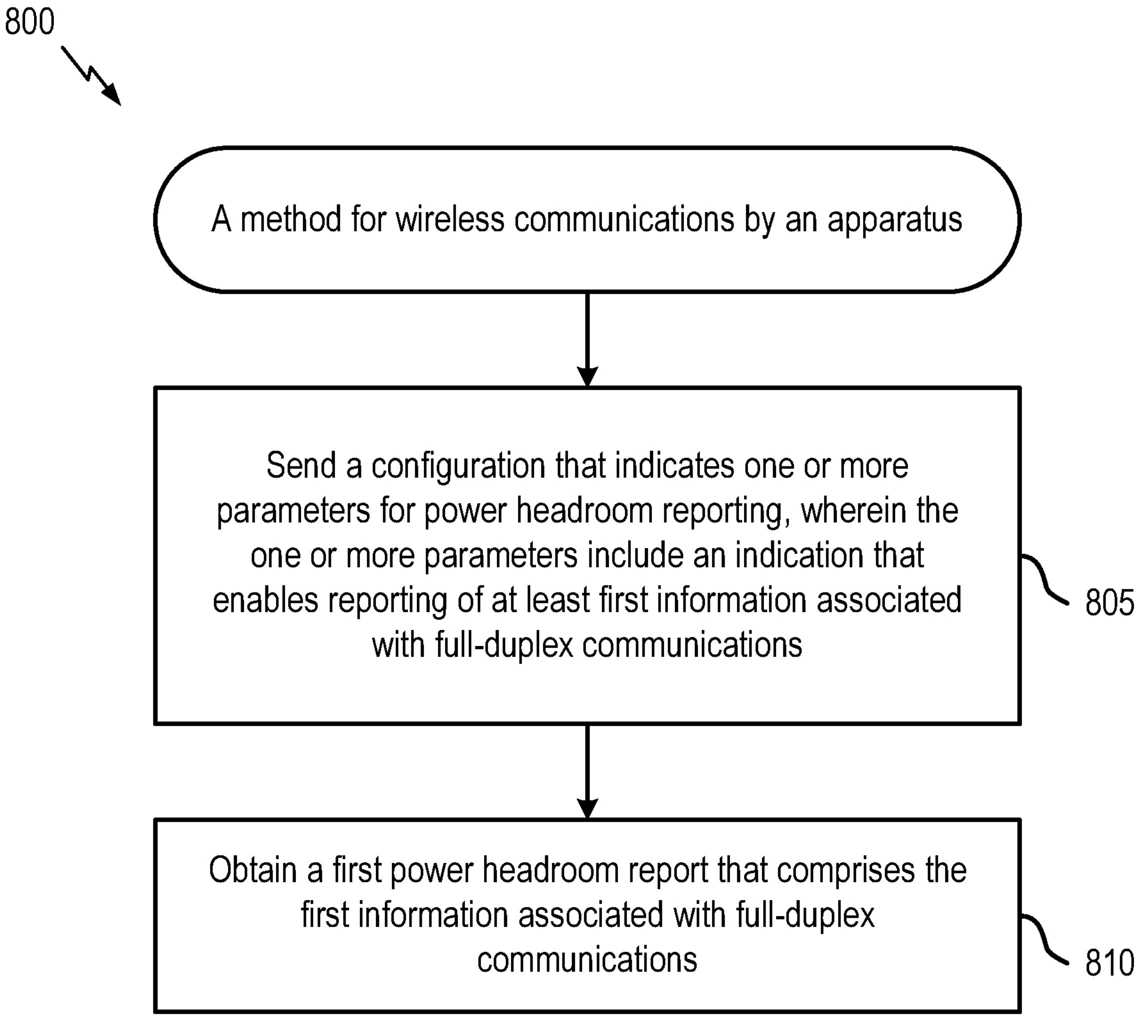
FIG. 8 depicts another method for wireless communications.

FIG. 8 shows a method 800 for wireless communications by an apparatus, such as BS 102 of FIGS. 1 and 3, or a disaggregated base station as discussed with respect to FIG. 2.

Method 800 begins at block 805 with sending a configuration that indicates one or more parameters for power headroom reporting, wherein the one or more parameters include an indication that enables reporting of at least first information associated with full-duplex communications. In certain aspects, the indication includes a field that indicates to enable reporting of the first information associated with full-duplex communications and second information associated with half-duplex communications.

Method 800 then proceeds to block 810 with obtaining a first power headroom report that comprises the first information associated with full-duplex communications, for example, as described herein with respect to FIG. 5. In certain aspects, the first information comprises: a power headroom value for full-duplex communications; and a maximum allowed transmit power. The power headroom report may allow a network entity to adjust certain communication parameter(s) based on the power headroom report, especially for FD communications, which can increase throughput, reduce latencies, and/or improve channel usage efficiencies.

In certain aspects, block 810 includes obtaining the first power headroom report via one or more first resources allocated for full-duplex communications, wherein the first information is based on a full-duplex communication via the one or more first resources.

In certain aspects, method 800 further includes obtaining, via one or more first resources allocated for half-duplex communications, a second power headroom report that includes second information associated with half-duplex communications, wherein the second information is based on a half-duplex communication via the one or more first resources. In certain aspects, the second information comprises: a power headroom value for half-duplex communications; and a maximum allowed transmit power.

In certain aspects, block 810 includes obtaining the first power headroom report via one or more first resources allocated for half-duplex communications, wherein the first information is based on a communication via one or more second resources allocated for full-duplex communications. In certain aspects, the communication includes a reference transmission.

In certain aspects, method 800 further includes obtaining, via one or more first resources allocated for full-duplex communications, a second power headroom report that includes second information, wherein the second information is based on a communication via one or more second resources allocated for half-duplex communications. In certain aspects, the communication includes a reference transmission.

In certain aspects, method 800 further includes obtaining capability information that indicates a user equipment supports application of uplink power control for full-duplex communications.

In certain aspects, method 800 further includes obtaining capability information that indicates a user equipment supports reporting power headroom information associated with full-duplex communications.

Figure 10:
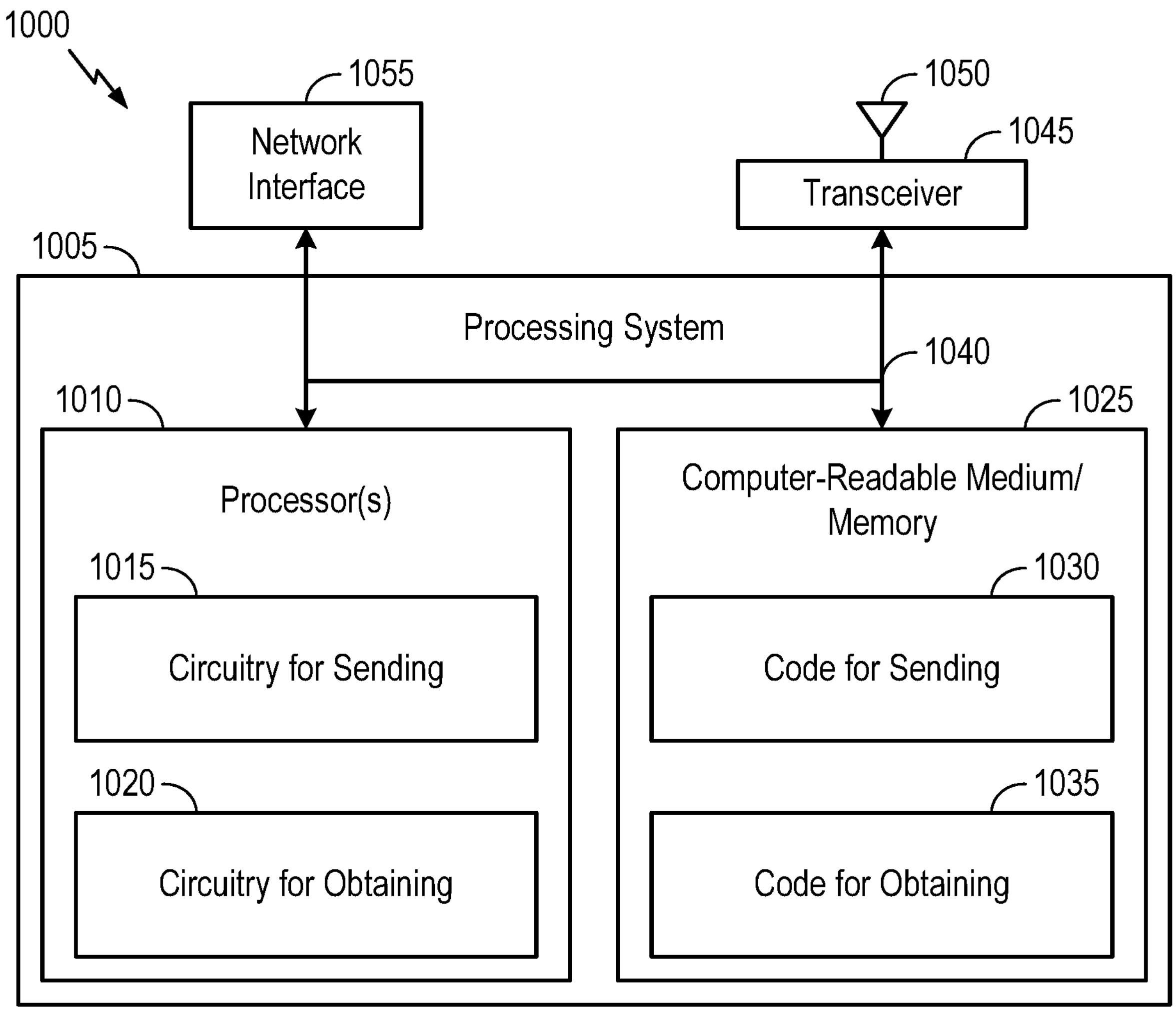
FIG. 10 depicts aspects of an example communications device.

In certain aspects, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative operations are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 905 coupled to a transceiver 955 (e.g., a transmitter and/or a receiver). The transceiver 955 is configured to transmit and receive signals for the communications device 900 via an antenna 960, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 930 via a bus 950. In certain aspects, the computer-readable medium/memory 930 is configured to store instructions (e.g., computer-executable code) that when executed by the one or more processors 910, enable and cause the one or more processors 910 to perform the method 700 described with respect to FIG. 7, or any aspect related to it, including any operations described in relation to FIG. 7. Note that reference to a processor performing a function of communications device 900 may include one or more processors performing that function of communications device 900, such as in a distributed fashion.

In the depicted example, computer-readable medium/memory 930 stores code for obtaining 935, code for sending 940, and code for refraining 945. Processing of the code 935-945 may enable and cause the communications device 900 to perform the method 700 described with respect to FIG. 7, or any aspect related to it.

The one or more processors 910 include circuitry configured to implement (e.g., execute) the code stored in the computer-readable medium/memory 930, including circuitry for obtaining 915, circuitry for sending 920, and circuitry for refraining 925. Processing with circuitry 915-925 may enable and cause the communications device 900 to perform the method 700 described with respect to FIG. 7, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 955 and/or antenna 960 of the communications device 900 in FIG. 9, and/or one or more processors 910 of the communications device 900 in FIG. 9. Means for communicating, receiving or obtaining may include the transceivers 354, antenna(s) 352, receive processor 358, AI processor 370, and/or controller/processor 380 of the UE 104 illustrated in FIG. 3, transceiver 955 and/or antenna 960 of the communications device 900 in FIG. 9, and/or one or more processors 910 of the communications device 900 in FIG. 9. Means for refraining may include AI processor 370 and/or controller/processor 380 of the UE 104 illustrated in FIG. 3, and/or one or more processors 910 of the communications device 900 in FIG. 9.

FIG. 10 depicts aspects of an example communications device 1000. In some aspects, communications device 1000 is a network entity, such as BS 102 of FIGS. 1 and 3, or a disaggregated base station as discussed with respect to FIG. 2.

The communications device 1000 includes a processing system 1005 coupled to a transceiver 1045 (e.g., a transmitter and/or a receiver) and/or a network interface 1055. The transceiver 1045 is configured to transmit and receive signals for the communications device 1000 via an antenna 1050, such as the various signals as described herein. The network interface 1055 is configured to obtain and send signals for the communications device 1000 via communications link(s), such as a backhaul link, midhaul link, and/or fronthaul link as described herein, such as with respect to FIG. 2. The processing system 1005 may be configured to perform processing functions for the communications device 1000, including processing signals received and/or to be transmitted by the communications device 1000.

The processing system 1005 includes one or more processors 1010. In various aspects, one or more processors 1010 may be representative of one or more of receive processor 338, transmit processor 320, TX MIMO processor 330, and/or controller/processor 340, as described with respect to FIG. 3. The one or more processors 1010 are coupled to a computer-readable medium/memory 1025 via a bus 1040. In certain aspects, the computer-readable medium/memory 1025 is configured to store instructions (e.g., computer-executable code) that when executed by the one or more processors 1010, enable and cause the one or more processors 1010 to perform the method 800 described with respect to FIG. 8, or any aspect related to it, including any operations described in relation to FIG. 8. Note that reference to a processor of communications device 1000 performing a function may include one or more processors of communications device 1000 performing that function, such as in a distributed fashion.

In the depicted example, the computer-readable medium/memory 1025 stores code for sending 1030 and code for obtaining 1035. Processing of the code 1030 and 1035 may enable and cause the communications device 1000 to perform the method 800 described with respect to FIG. 8, or any aspect related to it.

The one or more processors 1010 include circuitry configured to implement (e.g., execute) the code stored in the computer-readable medium/memory 1025, including circuitry for sending 1015 and circuitry for obtaining 1020. Processing with circuitry 1015 and 1020 may enable and cause the communications device 1000 to perform the method 800 described with respect to FIG. 8, or any aspect related to it.

More generally, means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1045, antenna 1050, and/or network interface 1055 of the communications device 1000 in FIG. 10, and/or one or more processors 1010 of the communications device 1000 in FIG. 10. Means for communicating, receiving or obtaining may include the transceivers 332, antenna(s) 334, receive processor 338, AI processor 318, and/or controller/processor 340 of the BS 102 illustrated in FIG. 3, transceiver 1045, antenna 1050, and/or network interface 1055 of the communications device 1000 in FIG. 10, and/or one or more processors 1010 of the communications device 1000 in FIG. 10.

EXAMPLE CLAUSES

Implementation examples are described in the following numbered clauses:

Clause 1: A method for wireless communications by an apparatus comprising: obtaining a configuration that indicates one or more parameters for power headroom reporting, wherein the one or more parameters include an indication to enable reporting of at least first information associated with full-duplex communications; and sending a first power headroom report that comprises the first information associated with full-duplex communications.

Clause 2: The method of Clause 1, wherein the indication includes a field that indicates to enable reporting of the first information associated with full-duplex communications and second information associated with half-duplex communications.

Clause 3: The method of any one of Clauses 1-2, wherein the first information comprises: a power headroom value for full-duplex communications; and a maximum allowed transmit power.

Clause 4: The method of any one of Clauses 1-3, wherein sending the first power headroom report comprises sending the first power headroom report via one or more first resources allocated for full-duplex communications, wherein the first information is based on a full-duplex communication via the one or more first resources.

Clause 5: The method of Clause 4, further comprising refraining from sending the first power headroom report in a payload communicated via one or more second resources allocated for half-duplex communications, wherein the one or more second resources occur in time before the one or more first resources.

Clause 6: The method of any one of Clauses 1-5, further comprising sending, via one or more first resources allocated for half-duplex communications, a second power headroom report that includes second information associated with half-duplex communications, wherein the second information is based on a half-duplex communication via the one or more first resources.

Clause 7: The method of Clause 6, further comprising refraining from sending the second power headroom report in a payload communicated via one or more second resources allocated for full-duplex communications, wherein the one or more second resources occur in time before the one or more first resources.

Clause 8: The method of Clause 6 or 7, wherein the second information comprises: a power headroom value for half-duplex communications; and a maximum allowed transmit power.

Clause 9: The method of any one of Clauses 1-8, wherein sending the first power headroom report comprises sending the first power headroom report via one or more first resources allocated for half-duplex communications, and the first information is based on a communication via one or more second resources allocated for full-duplex communications.

Clause 10: The method of Clause 9, wherein the communication includes a reference transmission.

Clause 11: The method of any one of Clauses 1-10, further comprising sending, via one or more first resources allocated for full-duplex communications, a second power headroom report that includes second information, wherein the second information is based on a communication via one or more second resources allocated for half-duplex communications.

Clause 12: The method of Clause 11, wherein the communication includes a reference transmission.

Clause 13: The method of any one of Clauses 1-12, further comprising sending capability information that indicates the apparatus supports application of uplink power control for full-duplex communications.

Clause 14: The method of any one of Clauses 1-13, further comprising sending capability information that indicates the apparatus supports reporting power headroom information associated with full-duplex communications.

Clause 15: A method for wireless communications by an apparatus comprising: sending a configuration that indicates one or more parameters for power headroom reporting, wherein the one or more parameters include an indication that enables reporting of at least first information associated with full-duplex communications; and obtaining a first power headroom report that comprises the first information associated with full-duplex communications.

Clause 16: The method of Clause 15, wherein the indication includes a field that indicates to enable reporting of the first information associated with full-duplex communications and second information associated with half-duplex communications.

Clause 17: The method of any one of Clauses 15-16, wherein the first information comprises: a power headroom value for full-duplex communications; and a maximum allowed transmit power.

Clause 18: The method of any one of Clauses 15-17, wherein obtaining the first power headroom report comprises obtaining the first power headroom report via one or more first resources allocated for full-duplex communications, wherein the first information is based on a full-duplex communication via the one or more first resources.

Clause 19: The method of any one of Clauses 15-18, further comprising obtaining, via one or more first resources allocated for half-duplex communications, a second power headroom report that includes second information associated with half-duplex communications, wherein the second information is based on a half-duplex communication via the one or more first resources.

Clause 20: The method of Clause 19, wherein the second information comprises: a power headroom value for half-duplex communications; and a maximum allowed transmit power.

Clause 21: The method of any one of Clauses 15-20, wherein obtaining the first power headroom report comprises obtaining the first power headroom report via one or more first resources allocated for half-duplex communications, and the first information is based on a communication via one or more second resources allocated for full-duplex communications.

Clause 22: The method of Clause 21, wherein the communication includes a reference transmission.

Clause 23: The method of any one of Clauses 15-22, further comprising obtaining, via one or more first resources allocated for full-duplex communications, a second power headroom report that includes second information, wherein the second information is based on a communication via one or more second resources allocated for half-duplex communications.

Clause 24: The method of Clause 23, wherein the communication includes a reference transmission.

Clause 25: The method of any one of Clauses 15-24, further comprising obtaining capability information that indicates a user equipment supports application of uplink power control for full-duplex communications.

Clause 26: The method of any one of Clauses 15-25, further comprising obtaining capability information that indicates a user equipment supports reporting power headroom information associated with full-duplex communications.

Clause 27: One or more apparatuses, comprising: one or more memories comprising executable instructions; and one or more processors configured to execute the executable instructions and cause the one or more apparatuses to perform a method in accordance with any one of Clauses 1-26.

Clause 28: One or more apparatuses, comprising: one or more memories; and one or more processors, coupled to the one or more memories, configured to cause the one or more apparatuses to perform a method in accordance with any one of Clauses 1-26.

Clause 29: One or more apparatuses, comprising: one or more memories; and one or more processors, coupled to the one or more memories, configured to perform a method in accordance with any one of Clauses 1-26.

Clause 30: One or more apparatuses, comprising means for performing a method in accordance with any one of Clauses 1-26.

Clause 31: One or more non-transitory computer-readable media comprising executable instructions that, when executed by one or more processors of one or more apparatuses, cause the one or more apparatuses to perform a method in accordance with any one of Clauses 1-26.

Clause 32: One or more computer program products embodied on one or more computer-readable storage media comprising code for performing a method in accordance with any one of Clauses 1-26.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors coupled to the one or more memories, the one or more processors being configured to cause the apparatus to:

obtain a configuration that indicates one or more parameters for power headroom reporting, wherein the one or more parameters include an indication to enable reporting of at least first information associated with full-duplex communications; and send, via one or more first resources allocated for half-duplex communications, a first power headroom report that comprises the first information associated with full-duplex communications, wherein the first information is based on a first communication via one or more second resources allocated for full-duplex communications.

2. The apparatus of claim 1, wherein the indication includes a field that indicates to enable reporting of the first information associated with full-duplex communications and second information associated with half-duplex communications.

3. The apparatus of claim 1, wherein:

the one or more processors are configured to cause the apparatus to send, via one or more first resources allocated for half-duplex communications, a second power headroom report that includes second information associated with half-duplex communications, and the second information is based on a half-duplex communication via the one or more first resources.

4. The apparatus of claim 1, wherein the first communication includes a reference transmission.

5. The apparatus of claim 1, wherein:

the one or more processors are configured to cause the apparatus to send, via the one or more second resources allocated for full-duplex communications, a second power headroom report that includes second information, and the second information is based on a second communication via the one or more first resources allocated for half-duplex communications.

6. The apparatus of claim 5, wherein the second communication includes a reference transmission.

7. The apparatus of claim 1, wherein the one or more processors are configured to cause the apparatus to send capability information that indicates the apparatus supports reporting power headroom information associated with full-duplex communications.

8. The apparatus of claim 1, wherein the first information includes an indication of a power headroom value for the first communication and an indication of a maximum allowed transmit power for the first communication.

9. An apparatus configured for wireless communications, comprising:

one or more memories; and one or more processors coupled to the one or more memories, the one or more processors being configured to cause the apparatus to:

send a configuration that indicates one or more parameters for power headroom reporting, wherein the one or more parameters include an indication that enables reporting of at least first information associated with full-duplex communications; and obtain, via one or more first resources allocated for half-duplex communications, a first power headroom report that comprises the first information associated with full-duplex communications, wherein the first information is based on a first communication via one or more second resources allocated for full-duplex communications.

10. The apparatus of claim 9, wherein the indication includes a field that indicates to enable reporting of the first information associated with full-duplex communications and second information associated with half-duplex communications.

11. The apparatus of claim 9, wherein:

the one or more processors are configured to cause the apparatus to obtain, via one or more first resources allocated for half-duplex communications, a second power headroom report that includes second information associated with half-duplex communications, and the second information is based on a half-duplex communication via the one or more first resources.

12. The apparatus of claim 9, wherein the first communication includes a reference transmission.

13. The apparatus of claim 9, wherein:

the one or more processors are configured to cause the apparatus to obtain, via the one or more second resources allocated for full-duplex communications, a second power headroom report that includes second information, and the second information is based on a second communication via the one or more first resources allocated for half-duplex communications.

14. The apparatus of claim 13, wherein the second communication includes a reference transmission.

15. The apparatus of claim 9, wherein the one or more processors are configured to cause the apparatus to obtain capability information that indicates a user equipment supports reporting power headroom information associated with full-duplex communications.

16. A method for wireless communications by an apparatus comprising:

obtaining a configuration that indicates one or more parameters for power headroom reporting, wherein the one or more parameters include an indication to enable reporting of at least first information associated with full-duplex communications; and sending, via one or more first resources allocated for half-duplex communications, a first power headroom report that comprises the first information associated with full-duplex communications, wherein the first information is based on a first communication via one or more second resources allocated for full-duplex communications.

* * * * *